June 12, 1945.   E. M. NELSON   2,378,154
FLEXIBLE WHEEL
Filed Nov. 26, 1943   3 Sheets-Sheet 1
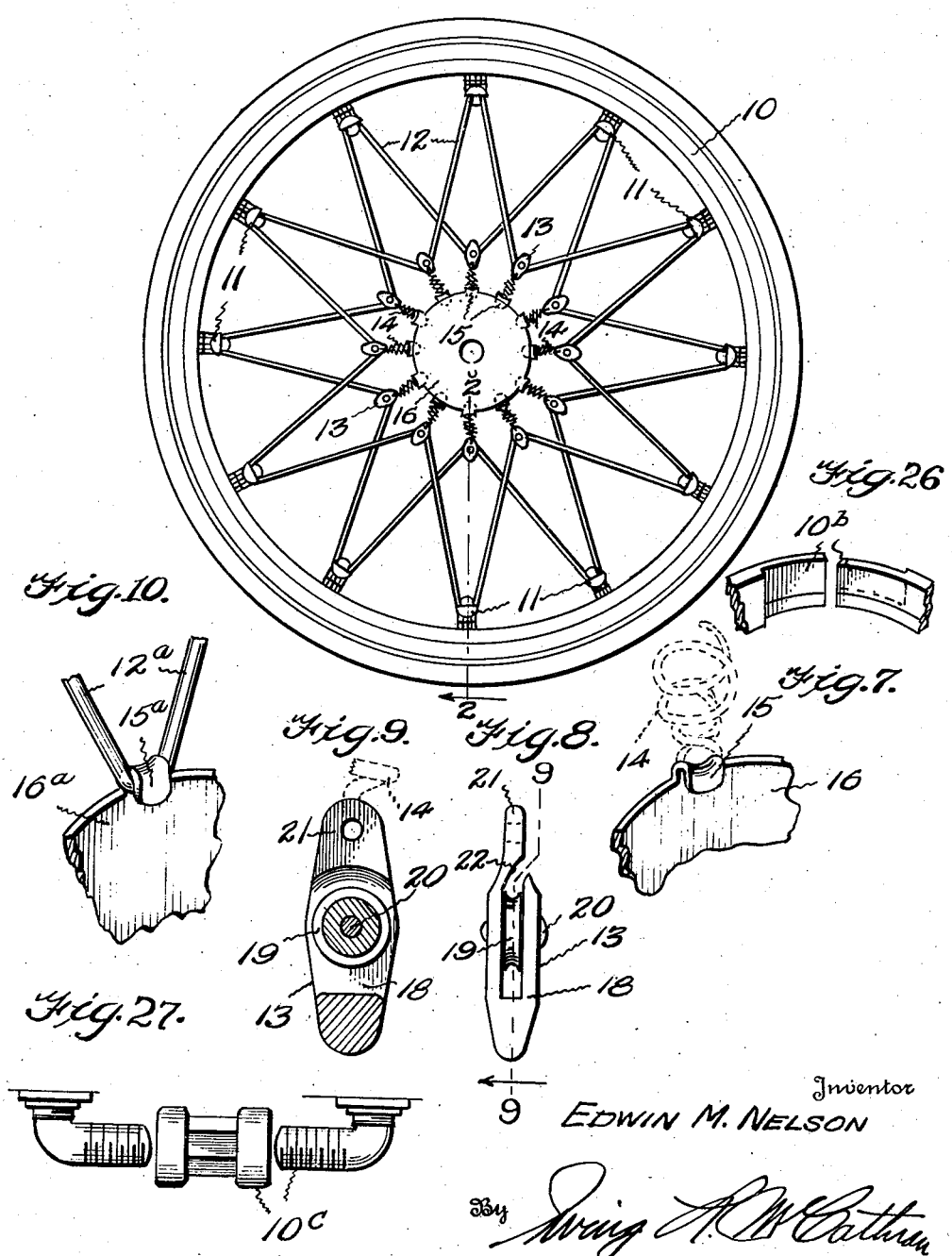
Inventor
EDWIN M. NELSON

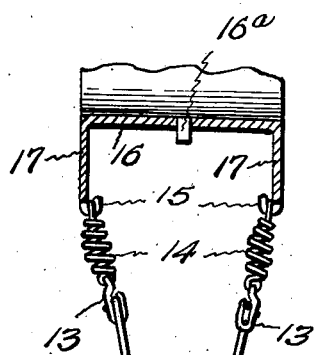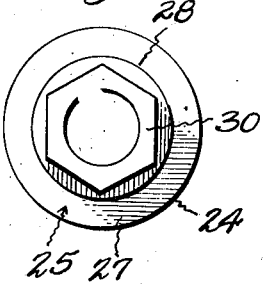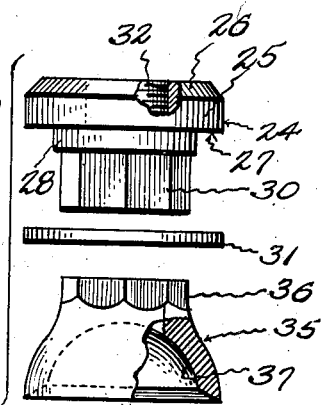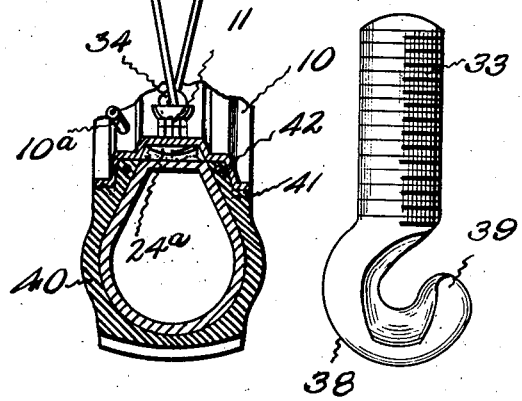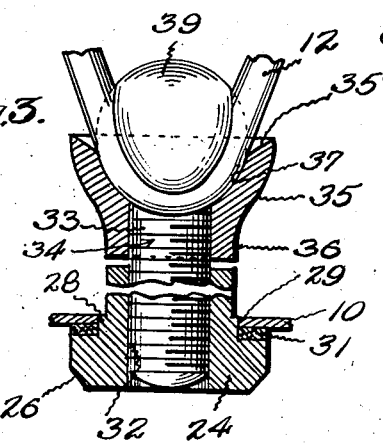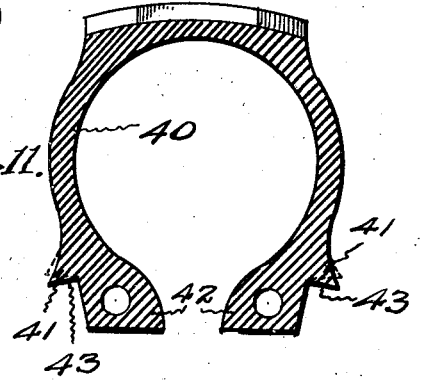

June 12, 1945. E. M. NELSON 2,378,154
FLEXIBLE WHEEL
Filed Nov. 26, 1943 3 Sheets-Sheet 3
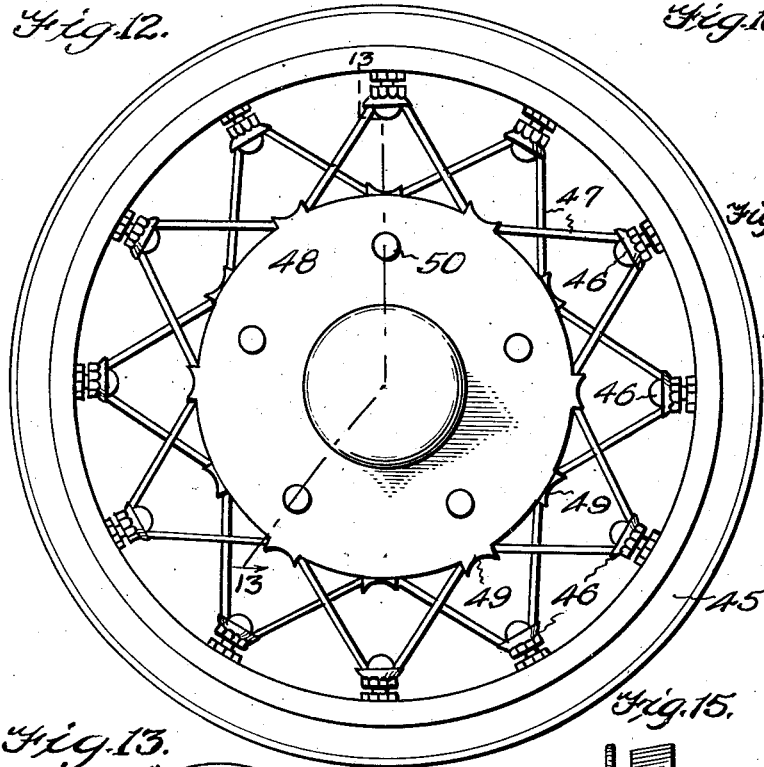
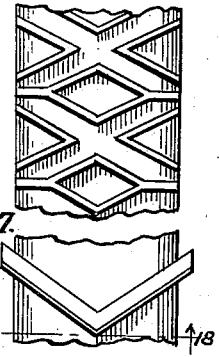
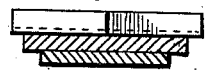
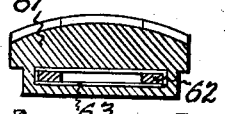
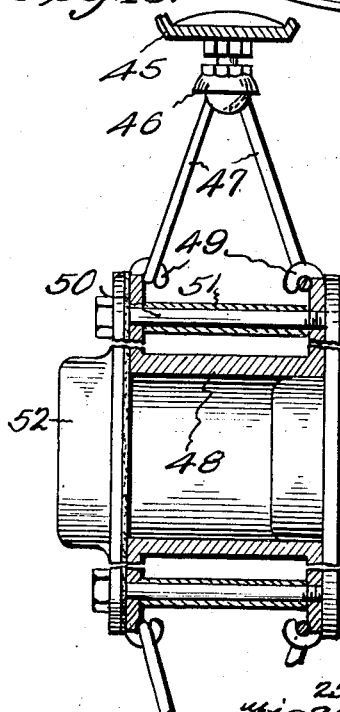
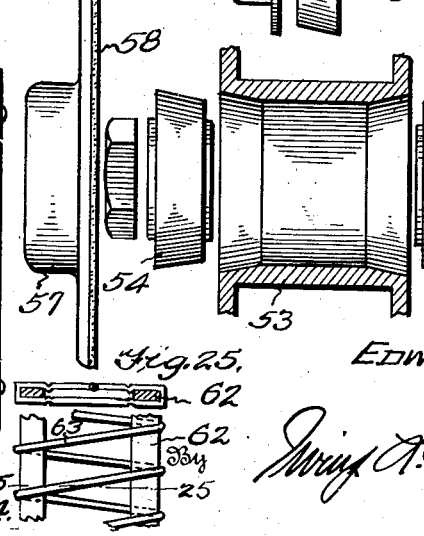
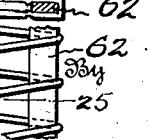
Inventor
EDWIN M. NELSON
Attorney Patented June 12, 1945

2,378,154

UNITED STATES PATENT OFFICE 2,378,154

FLEXIBLE WHEEL

Edwin M. Nelson, Hayward, Wis.

Application November 26, 1943, Serial No. 511,828

4 Claims. (Cl. 301—58)

This invention relates to a flexible wheel construction, and has for one of its objects the production of a simple and efficient wheel wherein the spokes thereof are formed of an endless length of wire rope or cable and special means are provided for attaching this rope or cable to the rim and hub of the wheel.

A further object of this invention is the production of a simple and efficient means for attaching the spoke element to the rim of a wheel and regulating the tension of the spoke element.

Another object of this invention is the production of simple and efficient tires especially designed for use with the flexible wheel construction.

Other objects and advantages of this invention will appear throughout the following specification and claims.

In the drawings:

Figure 1 is a side elevational view of the flexible wheel;

Figure 2 is an enlarged vertical sectional view taken on line 2—2 of Figure 1;

Figure 3 is an enlarged fragmentary sectional view taken through one form of rim-engaging element;

Figure 4 is a group side elevational view of the elements for attaching the flexible spoke element to the rim of the wheel;

Figure 5 is a plan view of one of the rim-engaging anchoring studs, looking at the shank end thereof;

Figure 6 is a side elevational view of one of the threaded tension or turn-buckle hooks for securing the flexible spoke element to the rim of the wheel;

Figure 7 is a fragmentary perspective of a portion of the hub, illustrating the construction of one of the spoke element attaching lugs;

Figure 8 is a side elevational view of one of the spoke element engaging pulleys;

Figure 9 is a vertical sectional view taken on line 9—9 of Figure 8;

Figure 10 is a fragmentary perspective view of a portion of the hub, illustrating the manner in which the flexible spoke element may directly engage the lugs carried by the hub;

Figure 11 is an enlarged transverse sectional view through the tire used in connection with the present invention;

Figure 12 is a side elevational view illustrating a modified form of wheel;

Figure 13 is an enlarged sectional view taken on line 13—13 of Figure 12;

Figure 14 is a sectional view of a modified type of hub structure, the parts being shown separated;

Figure 15 is a side elevational view of a grease-retaining ring and cap which may be used with the present invention;

Figure 16 is a plan view of a tire used in connection with the present invention;

Figure 17 is a plan view of a further modified form of tire;

Figure 18 is a transverse sectional view taken on line 18—18 of Figure 17;

Figure 19 is a transverse sectional view of a further modified type of tire and rim;

Figure 20 is a transverse sectional view of a still further modified type of tire;

Figure 21 is a transverse sectional view of another type of tire;

Figure 22 is a transverse sectional view of a modified form of tire rim;

Figure 23 is a transverse sectional view of another type of tire rim;

Figure 24 is a plan view of a binding;

Figure 25 is a transverse sectional view taken on line 25—25 of Figure 24.

Figure 26 is a fragmentary perspective view of one type of rim overlap;

Figure 27 is a side elevational view of a turnbuckle which may be used in conjunction with the rim assembly.

By referring to the drawings, it will be seen that 10 designates the felly or rim which carries flexible spoke-engaging elements 11, which flexible spoke-engaging elements 11 engage the flexible spoke element 12. This flexible spoke element 12 in turn engages the pulleys 13 and these pulleys 13 are connected to the coil springs 14 which coil springs 14 engage the spoke element attaching lugs 15 carried by the hub 16. The hub 16 is preferably constructed as illustrated in detail in Figure 2, having annular flanges 17, which flanges 17 carry the integral spoke-attaching lugs 15, these lugs 15 being bent inwardly to define hook-like elements for receiving the inner ends of the coil springs 14. The hub 16 is preferably provided with a suitable grease nipple 16ª, and the inner tube of the tire carries a valve stem 10ª which stem extends through the rim 10, as shown in Figure 2. The rim 10 may be continuous or may be provided with a suitable lap joint 10ᵇ illustrated in Figure 27, consisting of an outer lap or male end and a companion female end which fit snugly together and provide a flush outer face. Any suitable lap joint may be used. A turnbuckle 10ᶜ, shown in Figure 28, may be used with the lap joint 10ᵇ to hold the lap joint end of the rim together.

The coil springs 14 carry at their outer ends the pulleys 13 and these pulleys 13 are preferably constructed in the manner as shown in Figures 8 and 9. Each pulley 13 comprises a sheave 18 which supports a pulley wheel 19 upon a suitable pin 20. The sheave 18 is provided with an apertured outer end 21 for receiving the coil spring 14 and the sheave 18 is provided with a slot 22 to permit the entrance of the flexible spoke element 12. It should be understood that the lugs 15 may be formed in the manner shown in Figure 7, or they may be clinched inwardly as shown in dotted lines in Figure 7, and as shown in detail in Figure 2, to prevent accidental displacement of the springs 14 from these lugs 15.

The rim-engaging elements which attach the flexible spoke element 12 to the rim 10 are specially constructed and each rim-engaging element comprises a rim-anchoring stud 24, which stud is provided with an annular flange 25 bevelled, as at 26, upon one face and having an abutment shoulder 27 on its other or inner face which is adapted to engage the under face of the rim 10, as shown in Figure 3. The stud 24 is provided with a reduced annular collar 28 which is adapted to pass through an aperture 29 formed in the rim 10, and this stud is also provided with a hexagon shank 30 which is adapted to extend beyond the rim 10, as shown in Figure 3. A fiber sealing washer 31 is adapted to fit over the annular collar 28, and this washer 31 may be formed of any suitable sealing material to seal the portion of the rim 10 through which the stud 24 passes. The stud 24 is provided with an internally threaded aperture 32, as shown in Figure 4. This aperture 32 receives the threaded stem 33 of the tension or turnbuckle hook 34, and a special bell-like socket member or fastener 35 is threaded upon the stem 33 in the manner shown in Figure 3. This socket member 35 is provided with a hexagon shank 36 to facilitate the tightening of the fastener 35. The fastener 35 is bell-shaped or cup-shaped and is provided with a circular socket 37 into which is adapted to snugly fit the ball-like head 38 of the hook 34. The flexible spoke element 12 is adapted to fit under the hook portion 39 of the hook 34, and is adapted to fit into the cup-shaped socket 37 in the manner shown in Figure 3, the fastener 35 being adjustable so as to firmly clamp the flexible spoke element 12 under the hook portion 37 and bind this flexible spoke element 12 firmly in the socket 37 between the hook portion 39 and the socket 27, in the manner shown in Figure 3. The fastener 35 is provided with a bevelled outer edge 35ª to permit the flexible spoke element 12 to freely swing over the outer end of the socket member 35.

The stud 24 may be designed as indicated at 24ª, in Figure 2, if desired.

The flexible spoke element 12 may be formed of wire cable or other flexible material, and may be arranged to extend in the manner shown in Figures 1 and 2, so that one portion of the flexible spoke element may diverge toward the hub from the rim upon one side of the wheel and diverge from the rim toward the hub on the other side of the wheel. Preferably the flexible spoke element is formed of an endless length of flexible cable or the like, and is attached to the pulleys 13 in the manner shown, and is also hooked under the hook portions 39 of the hooks 34, these rim-engaging elements being adjustable to proper alignment and to obtain the proper tension upon the spoke element as well as to firmly secure the spoke element against accidental displacement from the hooks 39.

As shown in Figure 10, if a more rigid wheel is desired, the flexible spoke element 12ª may be passed directly under the lugs 15ª, which are carried by the rim 16ª. In other words, the flexible spoke element 12ª, as shown in Figure 10, may be directly connected to the lugs 15ª if desired, thereby eliminating the pulleys 13 and springs 14 when a more rigid wheel is desired.

In Figure 11 there is shown an enlarged transverse sectional view of the type of tire used with the present invention, wherein the tire casing 40 is provided with laterally extending lip-like flanges 41 near the inner edge of the tire adjacent the bead portions 42 of the tire. These lip-like portions 41 are undercut, as at 43, and are adapted to flex outwardly to the position shown in dotted lines in Figure 11 as the tire is forced into place upon the rim 10, thereby providing a tight fit upon the rim to seal the tire against the entrance of water and all foreign substances, such as dust, grit and the like, and thereby stabilize the tire.

It should be noted that the turnbuckles or hooks in conjunction with the studs, and associated elements, including the washer, will provide a water-tight and dust-proof joint. The threaded hooks are turned into the swivel burr and the endless wire rope or cable which constitutes the flexible spoke element is attached to the hooks. The burr or socket member is drawn outwardly upon the stem to produce the required strain. Easy adjustment and alignment is thereby made possible, allowing also for rapid "takedown" of the wheel when repairs are required. The bell fastener may be used whenever required, to hold the flexible spoke element firmly in engagement with the rim without damage to this spoke element. The hook will hold this spoke element firmly in place. A wax paste or similar water-proof mixture may be used whenever required at the lap joint of the rim to render the rim water-tight and prevent sand or dust from entering into the rim on the tire casing.

The particular type of tire illustrated in Figures 2 and 11 may be fixed to the flex wheel as designed, and when inflated serves as a stabilizer, preventing the vehicle upon which it is mounted from rolling from side to side upon the tires. The type of structure illustrated aids the vehicle in holding to the road and assists in preventing injury to the casing or inner tubes as well as keeping out water, dirt, and other foreign substances.

It should be understood that the stud 24, after the parts are assembled, may be rotated to draw the threaded hook 33 inwardly of the stud and to draw the fastener 35 toward the stud 24 thereby facilitating the adjustment of the tension of the flexible spoke element 12.

As shown in Figures 12 and 13, the wheel may be designed in a slightly different form from that shown in Figures 1 and 2. In the form shown in Figures 12 and 13, a rim 45 is provided which may be continuous, as shown, or the lap joint type. Spoke-engaging elements 46 of a type illustrated and described above, are carried by the rim 45 and are engaged by a flexible spoke element 47 similar to that previously described. The hub 48 carries a plurality of spoke-engaging lugs 49, as shown. The hub 48 shown in detail in Figure 13 may be mounted upon a spindle of a suitable type by using the bolts 50 which pass through sleeves 51, the sleeves 51 abutting the flanges of the hub 48, and bracing the same. The hub cap 52 is anchored in place by the bolts 50 and is changeable from side to side of the wheel or hub 48 thereof.

In Fig. 14 there is shown a modified form of the hub 53, which is adapted to be mounted upon either a straight or tapered axle where roller or ball-bearings 54 are used. The axle 55 extends through the hub and bearings and the nut 56 holds the parts together. A suitable hub cap 57 is adapted to be mounted in position similar to that shown in Figure 13, and carries a grease-retaining gasket 58 to provide a grease-retaining hub. A retainer shown in Figure 15 may be used as an optional form wherein 59 designates the felt washer and 60 the metal holder.

Figure 16 illustrates the design of one type of tire tread which may be used with certain types of tires.

In Figures 17 and 18 there is illustrated a still further type of tire, and non-skid tire tread.

Figures 19 and 20 and 21 illustrate further types of tires and treads, and Figures 22 and 23 illustrate different rim types which may be used. In the type of tire shown in Figures 21 and 24, the tire 61 is provided with steel circumferential reinforcing bands 62 interlaced with wire or similar material 63 within the body of the tire, which body may be formed of rubber or similar material.

It should be understood that the rim illustrated may be either a lap joint or continuous rim, and the desired type of rim may be selectively used with a desired type of tire, and that the various forms of hubs, as well as rim and tire structures, may be interchangeably used to suit the desire of the user or manufacturer, without departing from the spirit of the invention.

Having described the invention, what I claim is:

1. A spoke-receiving element comprising an anchoring stud adapted to extend through the rim of a wheel, a nut portion carried by the stud and adapted to extend beyond the rim of a wheel, a threaded hook threaded through said stud, a socket member constituting a fastener threaded upon said hook beyond the stud, said socket member being cup-shaped, and the hook having a ball-shaped hooked end adapted to fit within said cup-shaped socket member, and said hooked end being adapted to engage a spoke element for anchoring the spoke element in engagement with said rim.

2. A spoke-securing element comprising an anchoring stud adapted to extend through the rim of a wheel, a hook member adjustable through said stud, a socket member adjustable upon said hook member, said socket member having a dished pocket, said hook member having a ball-shaped hook end adapted to fit in said pocket, and a flexible spoke element adapted to be engaged by said hook end of said hook member for locking the flexible spoke within said pocket and under said hook end.

3. A spoke-securing element comprising an anchoring stud adapted to extend through the rim of a wheel, a hook member adjustable through said stud, a socket member adjustable upon said hook member, said socket member having a dished pocket, said hook member having a ball-shaped hook end adapted to fit in said pocket, a flexible spoke element adapted to be engaged by said hook end of said hook member for locking the flexible spoke within said pocket and under said hook end, and said pocket having a beveled edge at its outer end to permit said flexible spoke element to swing.

4. A wheel of the class described comprising a hub, a rim, a flexible spoke element threaded between the rim and hub to define radiating and diverging spoke portions, and adjustable means for attaching the spoke element to the rim, and locking the flexible spoke element at its point of attachment with the rim.

EDWIN M. NELSON.